United States Patent [19]

Ozaki

[11] Patent Number: 4,777,542
[45] Date of Patent: Oct. 11, 1988

[54] DATA RECORDING METHOD

[75] Inventor: Minoru Ozaki, Hyogo, Japan

[73] Assignee: Mitsubishi Denki Kabushiki Kaisha, Tokyo, Japan

[21] Appl. No.: 854,782

[22] Filed: Apr. 22, 1986

[30] Foreign Application Priority Data

Apr. 26, 1985 [JP] Japan .................................. 60-90349

[51] Int. Cl.$^4$ .............................................. G11B 5/09
[52] U.S. Cl. ........................................ 360/48; 360/40
[58] Field of Search ................ 360/48, 57, 40; 369/59

[56] References Cited

U.S. PATENT DOCUMENTS

| | | | |
|---|---|---|---|
| 4,216,460 | 8/1980 | Baldwin et al. | 371/57 |
| 4,323,931 | 4/1982 | Jacoby | 360/40 |
| 4,389,681 | 6/1983 | Tanaka et al. | 360/48 |
| 4,520,346 | 5/1985 | Shimada | 360/40 |
| 4,554,598 | 11/1985 | Terbox et al. | 360/48 |
| 4,626,826 | 12/1986 | Fukuda et al. | 360/40 |

Primary Examiner—Vincent P. Canney
Attorney, Agent, or Firm—Wolf, Greenfield & Sacks

[57] ABSTRACT

In a data recording method which uses a recording format having first and second preamble fields each for executing bit synchronism, first and second synchronization pattern fields each for defining the head position of a data stream, and a data field for recording the data stream, the first preamble field, the first synchronization pattern field, the second preamble field and the second synchronization pattern field are arranged in sequence in the order stated, and the first and second synchronization pattern fields are arranged in advance of the data stream. Also, the data stream is divided into a plurality of data blocks, and a re-synchronization pattern field having the same pattern as that of the synchronization pattern field is arranged just in advance of each of the data blocks.

9 Claims, 9 Drawing Sheets

| BEFORE MODULATION | AFTER MODULATION |
|---|---|
| 1 0 | 0 1 0 0 |
| 1 1 | 1 0 0 0 |
| 0 0 0 | 0 0 0 1 0 0 |
| 0 1 1 | 0 0 1 0 0 0 |
| 0 1 0 | 1 0 0 1 0 0 |
| 0 0 1 0 | 0 0 1 0 0 1 0 0 |
| 0 0 1 1 | 0 0 0 0 1 0 0 0 |

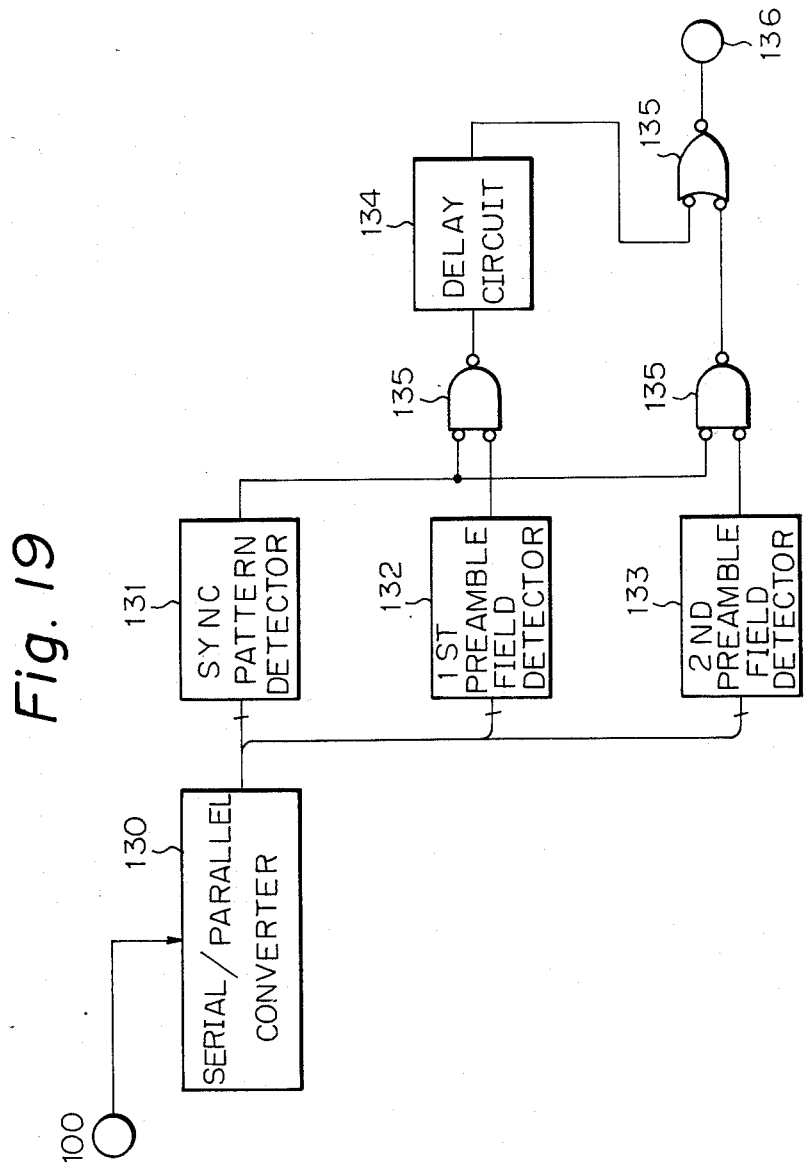

DATA RECORDING METHOD

BACKGROUND OF THE INVENTION

1. Field of the Invention

The present invention relates to a data recording method for recording intermittently or separately data streams of fixed length.

2. Prior Art

FIG. 1 shows a conventional recording format for a data recording system as disclosed in, for example, "Newest Floppy Disc Apparatus and Application Knowhow Thereof", by Shoji Takahashi, CQ Shuppan K.K., June 10, 1984. In the drawing are shown a preamble field 1 for executing bit synchronism, a synchronization pattern field 2 for defining the head position of a data steam, and a data field 3 for recording data.

The operation will next be explained. Since the recording format is formed such as to record the data streams intermittently, the respective data streams are read out from the data field 3 by executing the bit synchronism in the preamble field 1 having a higher sync pattern, such as an all "0" pattern, and then by defining the head position of the data field 3 in the sync pattern field 2. Also, in order to reproduce the head position of the data field 3, the sync pattern fields 2 are written into the recording format in a three-multiple manner.

However, according to the conventional data recording method described above, if an error occurs in the data field and once the bit synchronism is shifted, it becomes impossible to precisely decode the succeeding data. Additionally, since a plurality of sync pattern fields are multiplied in a continuous series, if an error once occurs, it is difficult to define the head position of the data and it is unsuitable, therefore, for the conventional recording format to be applied to a data recording system having a relatively high error rate.

SUMMARY OF THE INVENTION

The disadvantages or problems as described above can be overcome by the present invention.

It is an object of the present invention, therefore, to provide an improved data recording method which is capable of obtaining stable bit or data synchronism in a recording and/or playback system having a relatively high error rate.

Another object of the present invention is to provide a data recording method which uses a recording format in which a first preamble field for executing bit synchronism, a first synchronization pattern field for defining the head position of a data stream, a second preamble field for executing bit synchronism and a second sync pattern field for defining the head position of the data stream are arranged in sequence, and the first and second sync pattern fields are arranged in advance of the data stream in a multi-recording manner.

According to the present invention and, in particular, the foresaid method in which there is a difference in pattern between the first and second preamble fields, the order of the sync pattern fields associated therewith can be reliably determined.

Another object of the present invention is to provide a data recording method which uses a recording format having a plurality of preamble fields each for executing bit synchronism, a plurality of sync pattern fields each for defining the head position of a data stream, and a data field for recording a data stream, the plurality of preamble fields and the plurality of sync pattern fields being arranged alternately in sequence, and the sync pattern fields being arranged in advance of the data stream in a multi-recording manner.

Another object of the present invention is to provide a data recording method which uses a recording format in which a data stream is divided into a plurality of data blocks, and a re-synchronization pattern field having the same pattern as that of the sync pattern field is arranged in advance of each of the data blocks.

According to the present invention, the plurality of preamble fields and the plurality of sync pattern fields in the recording format are arranged alternately in sequence, that is, the respective sync pattern fields are recorded independently or intermittently in the format; the data stream is divided into the plurality of data blocks; and the re-sync pattern field having the same pattern as that of the sync pattern field is arranged just in advance of each of the data blocks. It is possible, therefore, to perform a stable recording/playback process, even if the data recording system being used has a relatively high error rate.

Still another object of the present invention is to provide a data recording method which uses a data recording format, in which is provided a sync gate for detecting sync signals, whereby if the re-sync pattern fields are successively detected at predetermined intervals of time then the sync gate is closed after a predetermined time period, even if no sync signal is detected in the succeeding re-sync pattern field, while if no sync signal is detected in the succeeding re-sync pattern field, the sync gate remains open so as to shift to a re-sync pattern retrieval mode.

Therefore, according to the present invention, it is possible to perform a stable sync operation under the control or closing/opening function of the sync gate.

These and other objects and advantages of the present invention will appear more clearly from the following detailed disclosure read in conjunction with the accompanying drawings.

BRIEF DESCRIPTION OF THE DRAWINGS

FIG. 19 shows one embodiment of the sync pattern detection circuit shown in FIG. 15.

PREFERRED EMBODIMENTS OF THE INVENTION

Figure 1:
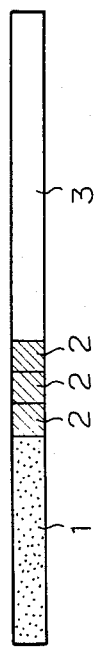
FIG. 1 shows a conventional recording format for a data recording system.
Figure 2:
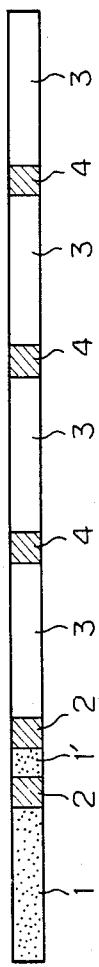
FIG. 2 shows a recording format for a data recording system in accordance with one embodiment of the present invention.
Figure 3:
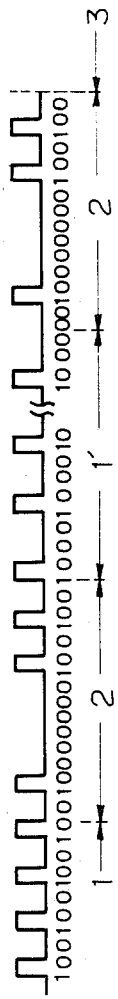
FIG. 3 shows in detail the sync pattern fields and the fields adjacent thereto shown in FIG. 2.

Referring to the drawings, one embodiment of the present invention will next be explained. In FIG. 2 are shown a first preamble field 1, a second preamble field 1', a synchronization pattern field 2, a data field 3, and a resynchronization pattern field 4. FIG. 3 shows the sync pattern field 2 and the fields adjacent thereto in detail. As shown in FIG. 3, the first preamble field 1 has a repetitive pattern having the shortest periodicity, such as a pattern "100100---" in the present embodiment, the second preamble field 1' has a repetitive pattern having relatively short periodicity, such as a pattern "10001000---", and the sync pattern field 2 has a pattern which cannot occur in the data field 3, for example, a pattern "0010000000100100" in this embodiment.

Figures 4, 5:
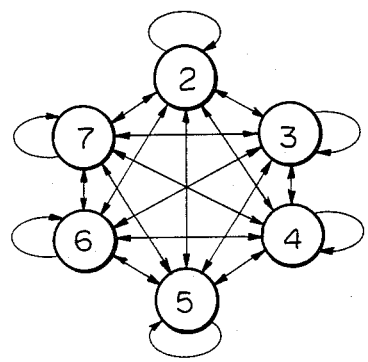
FIG. 4 shows a coding-rule table for a modulation system which may be used for the embodiment of the present invention.
FIG. 5 shows a state table illustrating the transition of "Zero-Run-Length" of the modulation system shown in FIG. 4.

FIG. 4 shows a coding-rule table for a modulation system which may be used for the present embodiment and is disclosed as "Run-Length-Limited Code" in U.S. Pat. No. 3,689,899 issued in 1972. In this modulation system, it is noted that the number of "0"(Zero-Run-Length) inserted between a first "1" and the next "1" is two at a minimum and seven at a maximum. The minimum "Zero-Run-Length" or the pattern "100100---" is used for the preamble field 1.

FIG. 5 is a state table illustrating the transition of "Zero-Run-Length" of the modulation system shown in FIG. 4. It is understood from FIG. 5 that there is no transition of "Zero-Run-Length" from 7 to 2. This means that the pattern of both of the sync pattern field 2 and the re-sync pattern field 4, that is, "0010000000100100" cannot occur in the modulation system of the present embodiment.

With respect to the re-sync pattern, FIGS. 6 through 10 illustrate one concept of the practical use of the recording format shown in FIG. 2. In these drawings are shown a playback signal stream (a), sync signals (b) which are detected in both the sync pattern field 2 and the re-sync pattern field 4, and sync gate signal (c) for detecting operatively the sync signals.

Figure 6:
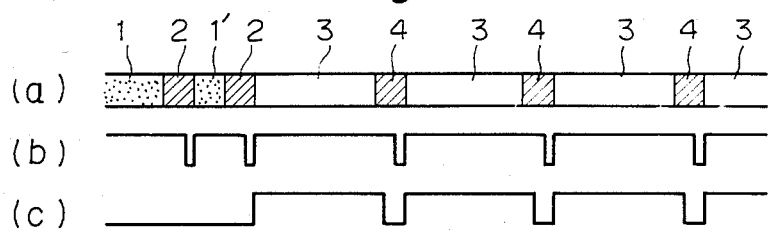
FIGS. 6 through 10 show a playback signal stream and the signals associated therewith, and illustrate one concept of the practical use of the recording format shown in FIG. 2.

FIG. 6 shows an operating case where all of the sync signals are precisely detected. Under the control of the sync gate signal, a sync gate is operated such as to be closed during a predetermined time period from the time when the sync signal is detected, and is then operated to be opened just prior to the time when the next sync signal must be detected.

Figure 7:
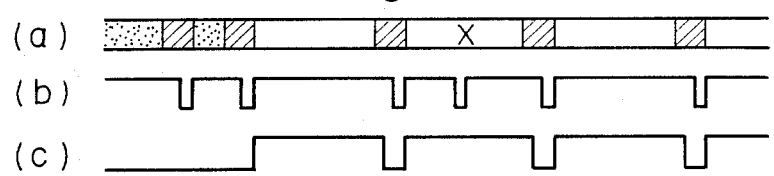

FIG. 7 shows an operating case where the same pattern as that of the sync pattern field 2 occurs in the data field 3 (see the mark "X" in the playback signal stream). As shown, an error sync signal can be effectively cancelled by the sync gate.

Figure 8:
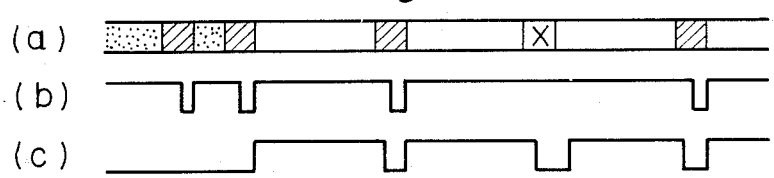

FIG. 8 shows a case where an error occurs in the re-sync pattern field 4 and that re-sync pattern cannot be generated.

Figure 9:
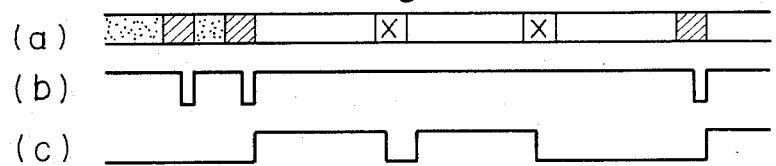

FIG. 9 shows a case where an error occurs in each of the succeeding re-sync pattern fields 4. When there is an error in the first re-sync pattern field 4, the sync gate is correspondingly closed at a given time, while it remains open for the next and succeeding errors in the re-sync pattern fields 4 associated respectively therewith, because accuracy in terms of detecting the occurrence of the ensuing sync signals grows worse.

Figure 10:
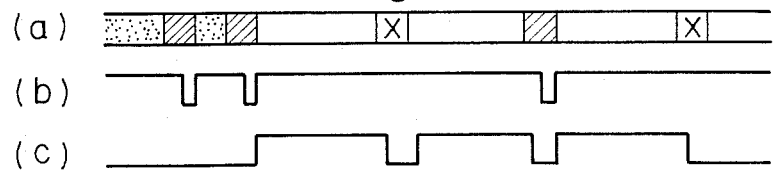

FIG. 10 shows a case where a re-sync pattern field 4 is independently detected and the succeeding sync signal is not detected. In other words, if a sync signal is detected at an error position (even if the error in the re-sync pattern field 4 occurs once), the sync gate is opened, so that an accurately timed sync signal can be detected shortly.

Figure 11:
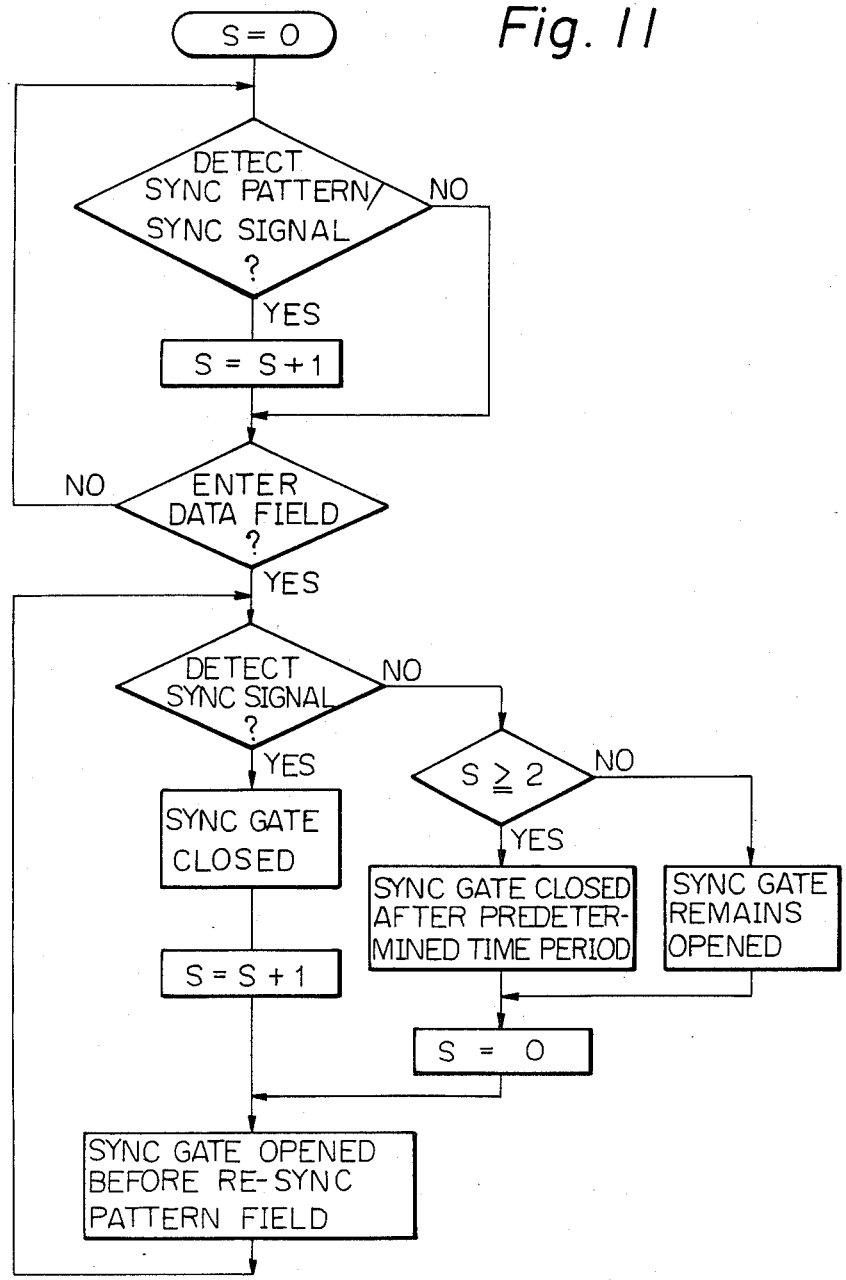
FIG. 11 shows a flow chart illustrating closing/opening control of the sync gate which is shown in FIGS. 6 through 10.

FIG. 11 is a flow chart illustrating opening/closing control of the sync gate which is shown in FIGS. 6 through 10.

As shown, if a plurality of sync signals are successively detected, the sync gate is closed after a predetermined time period, even if the succeeding sync signal is not detected.

If none of the sync signals are detected successively then the sync gate is opened.

If a sync signal is independently detected and then the succeeding sync signal is not detected, the sync gate remains open.

Focusing on the sync pattern field 2, if sync signals are detected in a plurality of sync pattern fields 2, the sync gate is closed after a predetermined time period, even if no sync signal is detected in the succeeding re-sync pattern field 4.

If a sync signal is solely detected in the sync pattern field 2 and the next sync signal is not detected in the succeeding re-sync pattern field 4, the sync gate remains open.

Although the modulation system of the preferred embodiment has been described in accordance with the coding-rule table shown in FIG. 4, it will be apparent to those skilled in the art that numerous modifications to the modulation system may be made within the scope of the invention.

Since a plurality of sync pattern fields 2 are written in the recording format, it is required to determine the order of the sync pattern fields. If the recording format is designed to have a difference in pattern between the first and second preamble fields, the order of the sync pattern fields associated therewith would be reliably identified. This can be effected by a logic circuit which, for example, will be described later with respect to FIG. 19.

Figure 12:
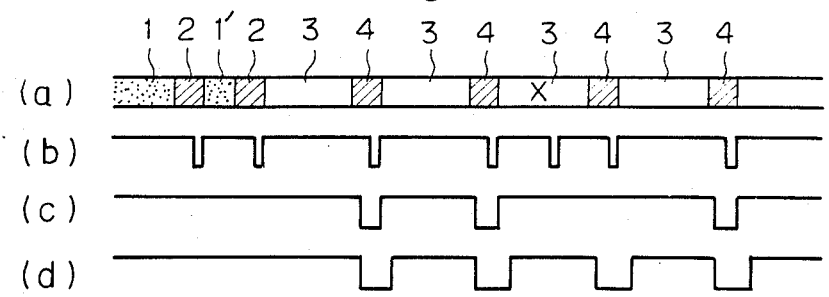
FIGS. 12 through 14 show a playback signal stream and the signals associated therewith, and illustrate another concept of the practical us of the recording format shown in FIG. 2.
Figure 13:
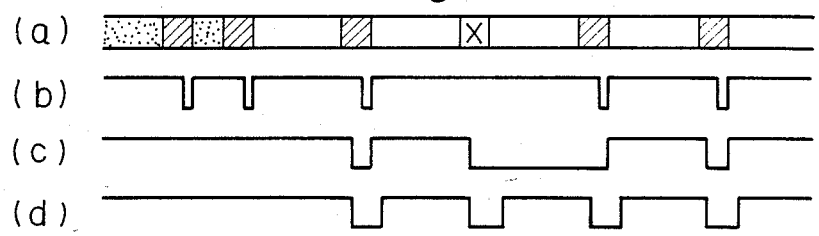
Figure 14:
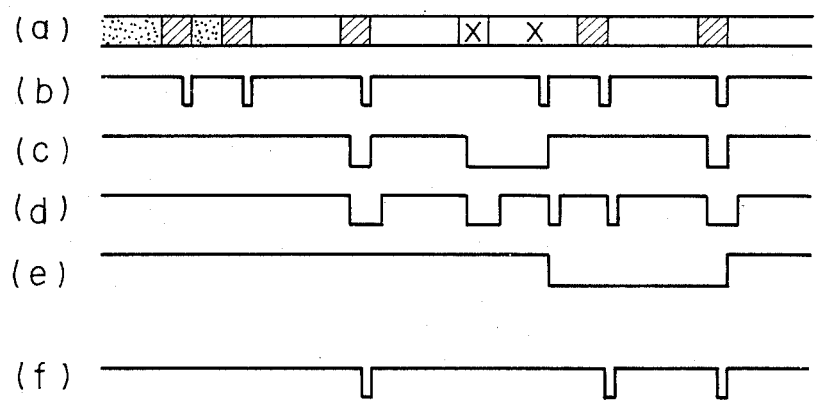

FIGS. 12 through 14 illustrate another concept of the practical use of the recording format shown in FIG. 2, with respect to the re-sync pattern. In these drawings are shown a playback signal stream (a), sync signals (b) which are detected in both the sync pattern field 2 and the re-sync pattern field 4, a first sync gate signal (c) generated by a first sync gate generator for detecting the sync signals, a second sync gate signal (d) generated by a second sync gate generator for detecting the sync signals, the first and second sync gate generators being described later with respect to FIG. 18, and a mode signal (e) generated by the combination of the first and second gate signals, as described below, for assuring the sync marks.

FIG. 12 shows an operating case where the same pattern as that of the sync pattern field 2 occurs in the data field 3. As shown, an error or false sync signal can be cancelled by the sync gate signals.

FIG. 13 shows a case where an error occurs in the resync pattern field 4 and the re-sync pattern cannot be generated.

FIG. 14 shows a case where an error occurs in the resync pattern field 4 and the same pattern as that of the sync pattern field 2 occurs in the data field 3.

As shown in FIGS. 12 through 14, the first sync gate signal (c) is changed from a low level (logic "0") state to a high level (logic "1") state, that is, the gate is closed, when the sync signal (b) is detected. Then, after the high state is maintained during a fixed time period slightly shorter than the generation period of the sync signals, the sync gate signal is changed to the low state, that is, the gate is opened.

The second sync gate signal (d) is initialized when the first gate signal (c) or the mode signal (e) is in the low state and the sync signal (b) is detected, and the gate remains open during a time period exceeding the duration of the sync signal.

The mode signal (e) is reset and changed to the low state when the first sync gate signal (c) is in the low state, the second sync gate signal (d) is in the high state and the sync signal (b) is detected. The mode signal is set when the second sync gate signal (d) is in the low state and the sync signal (b) is detected.

Thus, when the second sync gate singal (d) is in the low state or the mode signal (e) is in the low state, the detected sync signal (b) can be processed as a true sync signal which may be used for the data synchronization.

Figure 15:
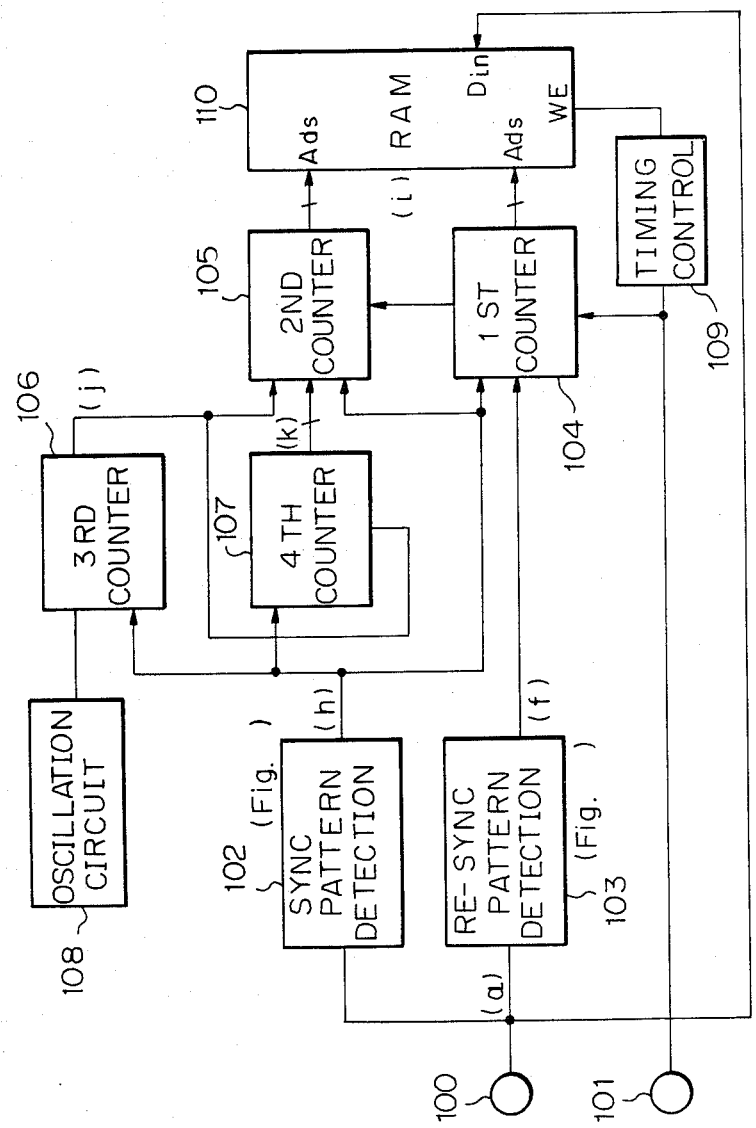
FIG. 15 shows one embodiment of a circuit for performing the data synchronism when a playback signal stream is serially stored in an RAM.

FIG. 15 shows in the form of a block diagram a circuit for performing the data synchronism when a stream of playback signals (a) is serially stored in an RAM. In the drawing are shown a sync pattern detection circuit 102, a re-sync pattern detection circuit 103, a first counter 104, a second counter 105, a third counter 106, a fourth counter 107, an oscillation circuit 108, a timing control circuit 109, and an RAM 110.

Figure 16:
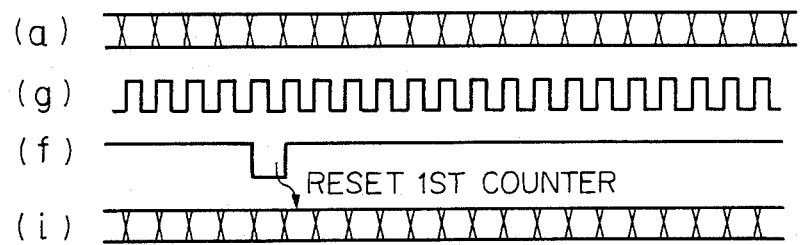
FIGS. 16 and 17 show signal waveform diagrams illustrating the operation of the circuit shown in FIG. 15.
Figure 17:
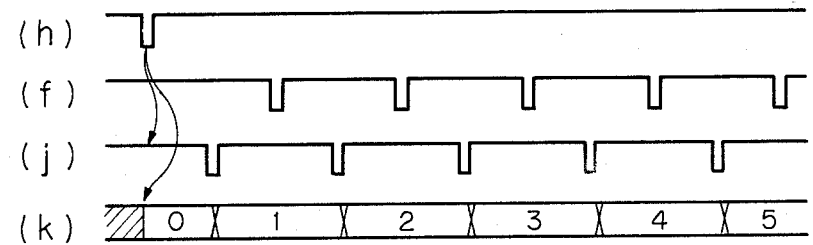

Referring now to FIGS. 16 and 17, the operation of the circuit shown in FIG. 15 will next be explained.

The sync pattern detection circuit 102 receives the playback signal stream (a) in FIG. 16 through a playback signal input terminal 100 and, when the sync pattern in the stream is detected, the circuit 102 outputs a sync signal (h). The re-sync pattern detection circuit 103 also receives the playback signal stream through the input terminal 100 and, when the re-sync pattern is detected, the circuit 103 outputs a sync signal (f).

All of the counters, that is, the first, second, third and fourth counters 104, 105, 106 and 107, respectively, are initialized by the detected sync signal (h).

The first counter 104 operates to count playback clock signals or pulses (g) which are inputted to a clock input terminal 101. These signals are synchronized with the playback signals (a). Then, the counter 104 is reset by the detected signal (f) which is outputted from the re-sync pattern detection circuit 103.

The second counter 105 acts as a data sync counter which advances its count each time the count of the first counter 104 reaches a value corresponding to the generation period of the re-sync patterns, or the counter 104 is reset by the detection of the sync signal (f). Also, the second counter 105 is preset by a count value "(k)" which is outputted from the fourth counter 107, as described below.

The third counter 106 counts clock signals from the oscillation circiut 108 comprising, for example, a crystal oscillator, and outputs a signal (j) which is generated each time the count of the third counter 106 reaches the value corresponding to the generation period of the re-sync patterns. It should be noted that the third counter 106 is initialized by the signal (h) from the sync pattern detection circuit 102 so that, as shown in FIG. 17, the signals (j) and the detected signals (f) from the re-sync pattern detection circuit 103 are 180° out-of-phase.

The fourth counter 107 acts as a counter for presetting the data sync counter 105, and operates to count the output signals (j) of the third counter 106. When the count of the counter 107 reaches the value of (k), the corresponding signal is generated and applied to the second counter 105 so as to preset the value therein.

Thus, when a series of playback clock signals (g) are applied through the timing control circuit 109 to "WE" of the RAM 110, as Write Enable signals, the data in the playback signals (a) are sequentially applied to "Din" of the RAM 110 and therefore are written into appropriate memory locations therein in accordance with address signals (i) from the data sync counter 105.

Although, in FIG. 15, the sync pattern detection circuit 102 and the re-sync pattern detection circuit 103 are provided discretely, assuming that the patterns of both the sync pattern field 2 and the re-sync pattern field 4 are identical, it is apparent that most of the components in these circuits can be used in common.

Figure 18:
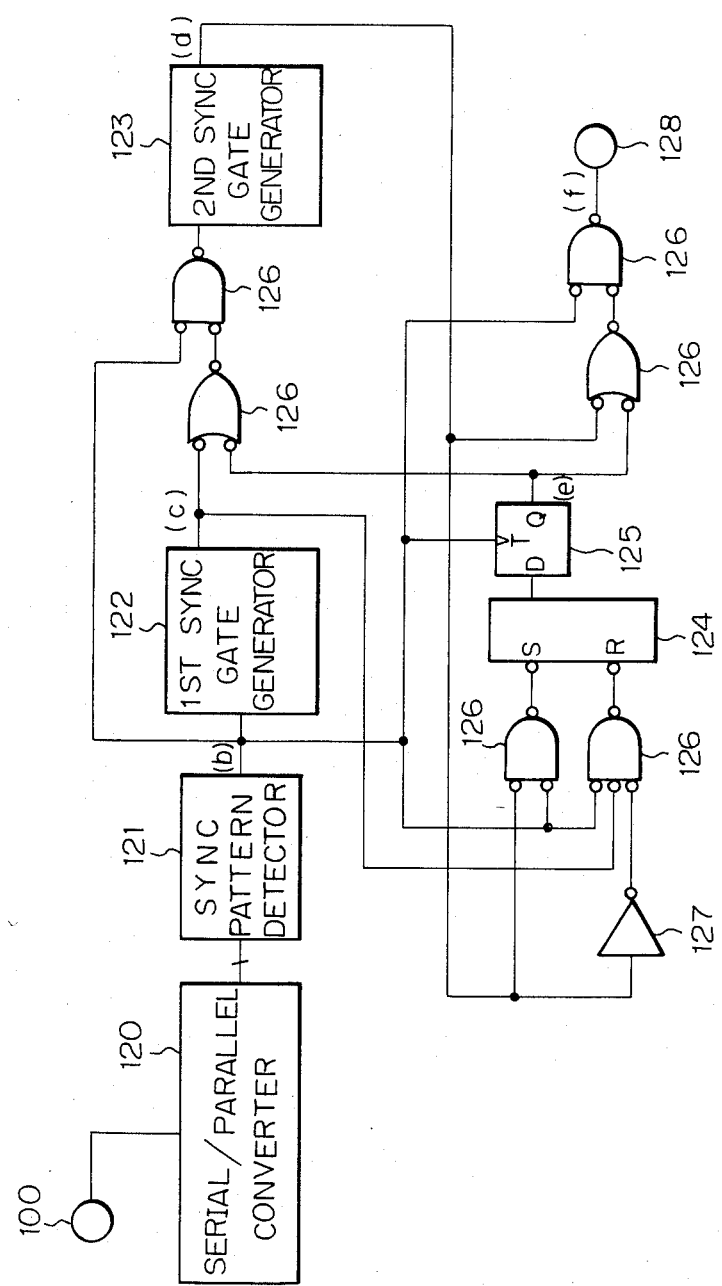
FIG. 18 shows one embodiment of the re-sync pattern detection circuit shown in FIG. 15.

FIG. 18 shows one embodiment of the re-sync pattern detection circuit 103 shown in FIG. 15. The circuit 103 comprises a serial/parallel converter 120, a sync pattern detector 121, a first sync gate generator 122, a second sync gate generator 123, an R-S flip-flop 124, a D-type flip-flop 125, gate circuits 126, and an inverter 127.

In operation, the playback signal stream (a) (see FIGS. 12 to 14) which is inputted to the input terminal 100 is converted by a serial/parallel converter 120 to a parallel signal corresponding to the bit length of the re-sync pattern field 4 as shown in FIG. 3. The sync pattern detector 121 receives the parallel signal and then outputs first sync singals (b) when the condition of the sync pattern is satisfied. When the sync signal (b) is detected, the first sync gate generator 122 outputs the first sync gate signal (c) which is changed to the low level state after the high state is maintained during the fixed time period, as described above. Then, when the first gate signal (c) or the mode signal (e) which is outputted from the D-type flip-flop 125 is in the low state and the sync signal (b) is detected, the second sync gate generator 123 is operated to set a switching phase and thus outputs the second sync gate signal (d) which is switched between the low and high states at the generation period of the re-sync patterns. The R-S flip-flop 124 is set when the second sync gate signal (d) is in the low state and the sync signal (b) is detected, and is reset when the second sync gate signal (d) is in the high state, the first sync gate signal (c) is in the low state and the sync signal (b) is detected. The D-type flip-flop 125 functions to slightly delay the output signal of the R-S flip-flop 124 so as to generate the mode signal (e).

According to the circuit shown in FIG. 18, although the sync signals (b) may include any false sync signal undesirably generated in the playback signal stream (a), as well as the true sync signals, the true sync signals can be effectively outputted from an output terminal 128 only when either the second sync gate signal (d) or the mode signal (e) is in the low level state or the logic "0". Thus, the signal (d) acts as a gate for representing the positions of the true sync signals, while the mode signal (e) acts as a gate which is opened when the positions of the sync signals are not determined.

FIG. 19 shows one embodiment of the sync pattern detection circuit 102 shown in FIG. 15 and, in particular, represents a case where the recording format is designed to have a difference in pattern between the first and second preamble fields 1 and 1' shown in FIG. 3 and, therefore, it is required to determine the order of the sync pattern fields 2. In the drawing are shown a serial/parallel converter 130, a sync pattern detector 131, a first preamble field detector 132, a second preamble field detector 133, a delay circuit 134 and gate circuits 135.

In operation, the playback signal stream (a) inputted to the input terminal 100 is converted by a serial/parallel converter 130 to a parallel signal corresponding to the bit length of the sync pattern field 2. The parallel signal is applied to each of the sync pattern detector 131, the first preamble field detector 132 and the second preamble field detector 133.

The first preamble field detector 132 outputs a low level or logic "0" signal during a predetermined time period, when the first preamble field 1 is detected thereby. Similarly, the second preamble field detector 133 outputs a low level signal during a predetermined time period, when the second preamble field 1' is detected by that detector.

The determination of the order of the sync pattern fields 2 can be effected by the output level states of the first and second preamble field detectors 132 and 133, when the sync pattern field 2 is detected by the sync pattern detector 131. That is, if the preceding sync pattern field is detected by the detector 131, the detected signal is applied to the delay circuit 134 under the low state of the output of the first preamble field detector 132, and is delayed by a predetermined number of bits therein. As a result, the delayed signal is outputted from an output terminal 136, as a sync signal. On the other hand, if the succeeding sync pattern field is detected by the detector 131 under the low state of the output of the second preamble field detector 133, the detected signal is applied to the output terminal 136 without delaying it.

Although in the preferred embodiments the recording format in which the sync pattern fields are recorded in the two-multiple manner is disclosed, it may be possible to apply, for example, a three- or four-multiple approach to the format.

Also, although the preferred embodiments have been described in detail herein, it will be apparent to those skilled in the art that numerous modifications and substitution may be made within the scope of the invention.

What is claimed is:

1. A data recording method which uses a recording format characterized by arranging in sequence a first preamble field (1) for executing bit synchronism, a first synchronization pattern field (2) for defining the head position of a data stream, a second preamble field (1') for executing bit synchronism and a second synchronization pattern field (2) having the same pattern as that of said first synchronization pattern field, and characterized by arranging said first and second synchronization pattern fields in advance of said data stream (3).

2. The data recording method as set forth in claim 1, further characterized in that the pattern of said first preamble field is different from the pattern of said second preamble field.

3. The data recording method as set forth in either of claims 1 and 2, further characterized in that said data stream is divided into a plurality of data blocks, and a re-synchronization pattern field having the same pattern as that of said synchronization pattern field is arranged in advance of each of said data blocks.

4. The data recording method as set forth in claim 3, further characterized in that said synchronization pattern field and said re-synchronization pattern field have patterns, neither of which can occur in said data field.

5. A data recording method which uses a recording format characterized by having a plurality of preamble fields each for executing bit synchronism, a plurality of synchronization pattern fields each for defining the head position of a data stream, and a data field for recording a data stream, said plurality of preamble fields and said plurality of synchronization pattern fields being arranged alternately in sequence, and said synchronization pattern fields being arranged in advance of said data stream in a multi-recording manner.

6. In data recording apparatus which includes synchronization gate means which can be opened to allow detection of synchronization signals, a data recording method for recording a data stream which is divded into a plurality of data blocks, each data block comprised of a plurality of data bits, said method comprising the steps of:

A. arranging in sequence:
 a first preamble field for establishing bit synchronism,
 a first synchronization pattern field for defining the head position of said data stream,
 a second preamble field for establishing bit synchronism,
 a second synchronization pattern field having the same bit pattern as said first synchronization pattern field,
 a plurality of said data blocks, and
 a plurality of re-synchronization pattern fields having the same bit pattern as said first and second synchronization pattern fields, one of said re-synchronization pattern fields being located in advance of each of said data blocks, B. periodically opening said synchronization gate means at times when a synchronizing signal is expected and closing said synchronization gate means upon detection of said synchronizing signal, C. closing said synchronization gate means after a predetermined time period even if no synchronization signal is detected when a predetermined succession of re-synchronization pattern fields have been detected previously at predetermined intervals of time, and D. allowing said synchronization gate means to remain open if a synchronization signal is not detected when less than said predetermined succession of re-synchronization pattern fields have been previously detected at predetermined intervals of time, so as to shift operation of the apparatus into a re-synchronization pattern retrieval mode.

7. In data recording apparatus which includes synchronization gate means which can be opened to allow detection of synchronization signals, a data recording method for recording a data stream which is divided into a plurality of data blocks, each data block comprised of a plurality of data bits, said method comprising the steps of:

A. arranging in sequence:
 a first preamble field for establishing bit synchronism, a first synchronization pattern field for defining the head position of said data stream, a second preamble field for establishing bit synchronism, said second preamble field having a bit pattern which is different from the bit pattern of said first preamble field, a second synchronization pattern field having the same bit pattern as said first synchronization pattern field, a plurality of said data blocks, and a plurality of re-synchronization pattern fields having the same bit pattern as said first and second synchronization pattern fields, one of said re-synchronization pattern fields being located in advance of each of said data blocks, B. periodically opening said synchronization gate means at times when a synchronizing signal is expected and closing said synchronization gate means upon detection of said synchronizing signal, C. closing said synchronization gate means after a predetermined time period even if no synchronization signal is detected when a predetermined succession of re-synchronization pattern fields have been detected previously at predetermined intervals of time, and D. allowing said synchronization gate means to remain open if a synchronization signal is not detected when less than said predetermined succession of re-synchronization pattern fields have been previously detected at predetermined intervals of time, so as to shift operation of the apparatus into a re-synchronization pattern retrieval mode.

8. In data recording apparatus which includes synchronization gate means which can be opened to allow detection of synchronization signals, a data recording method for recording a data stream which is divided into a plurality of data blocks, each data block comprised of a plurality of data bits, said method comprising the steps of:

A. arranging in sequence:

a first preamble field for establishing bit synchronism, a first synchronization pattern field for defining the head position of said data steam, said first synchronization field having a bit pattern which cannot occur in said data stream, a second preamble field for establishing bit synchronism, a second synchronization pattern field having the same bit pattern as said first synchronization pattern field, a plurality of said data blocks, and a plurality of re-synchronization pattern fields having the same bit pattern as said first and second synchronization pattern fields, one of said re-synchronization pattern fields being located in advance of each of said data blocks, B. periodically opening said synchronization gate means at times when a synchronizing signal is expected and closing said synchronization gate means upon detection of said synchronizing signal, C. closing said synchronization gate means after a predetermined time period even if no synchronization signal is detected when a predetermined succession of re-synchronization pattern fields have been detected previously at predetermined intervals of time, and D. allowing said synchronization gate means to remain open if a synchronization signal is not detected when less than said predetermined succession of re-synchronization pattern fields have been previously detected at predetermined intervals of time, so as to shift operation of the apparatus into a re-synchronization pattern retrieval mode.

9. In data recording apparatus which includes synchronization gate means which can be opened to allow detection of synchronization signals, a data recording method for recording a data stream which is divided into a plurality of data blocks, each data block comprised of a plurality of data bits, said method comprising the steps of:

A. arranging in sequence:

a first preamble field for establishing bit synchronism, a first synchronization pattern field for defining the head position of said data stream, said first synchronization field having a bit pattern which cannot occur in said data stream, a second preamble field for establishing bit synchronism, said second preamble field having a bit pattern which is different from the bit pattern of said first preamble field, a second synchronization pattern field having the same bit pattern as said first synchronization pattern field, a plurality of said data blocks, and a plurality of re-synchronization pattern fields having the same bit pattern as said first and second synchronization pattern fields, one of said re-synchronization pattern fields being located in advance of each of said data blocks, B. periodically opening said synchronization gate means at times when a synchronizing signal is expected and closing said synchronization gate means upon detection of said synchronizing signal, C. closing said synchronization gate means after a predetermined time period even if no synchronization signal is detected when a predetermined succession of re-synchronization pattern fields have been detected previously at predetermined intervals of time, and D. allowing said synchronization gate means to remain open if a synchronization signal is not detected when less than said predetermined succession of re-synchronization pattern fields have been previously detected at predetermined intervals of time, so as to shift operation of the apparatus into a re-synchronization pattern retrieval mode.

* * * * *